United States Patent

Miyagi et al.

[11] Patent Number: 5,779,579
[45] Date of Patent: Jul. 14, 1998

[54] PULLEY ASSEMBLY FOR DRIVEN SHAFT

[75] Inventors: Yoshiyuki Miyagi, Ichikawa; Moena Hori, Yokohama; Shigeru Takabe, Sagamihara, all of Japan

[73] Assignee: Ishikawajima-Harima Heavy Industries, Co., Ltd., Tokyo, Japan

[21] Appl. No.: 658,685

[22] Filed: Jun. 5, 1996

[30] Foreign Application Priority Data

Nov. 29, 1995 [JP] Japan .................. 7-311358

[51] Int. Cl.$^6$ ........................................... F16H 9/00
[52] U.S. Cl. .................... 474/72; 474/150; 474/161; 64/604; 123/195 H
[58] Field of Search ................... 474/72, 150, 161; 64/604; 123/195 H

[56] References Cited

U.S. PATENT DOCUMENTS

| | | | |
|---|---|---|---|
| 4,378,220 | 3/1983 | Seppala et al. | 464/55 |
| 4,433,594 | 2/1984 | Smirl | 74/689 |
| 4,685,898 | 8/1987 | Wiens | 474/149 |
| 4,703,725 | 11/1987 | Weertman | 123/192 B |
| 5,013,286 | 5/1991 | Breher | 474/205 |
| 5,405,296 | 4/1995 | Cerny et al. | |

FOREIGN PATENT DOCUMENTS

| | | |
|---|---|---|
| 05322005 | 12/1993 | Japan . |
| 6323402 | 11/1994 | Japan . |
| 07063248 | 3/1995 | Japan . |
| 07229552 | 8/1995 | Japan . |
| 7229408 | 8/1995 | Japan . |
| 7293466 | 11/1995 | Japan . |
| 7332471 | 12/1995 | Japan . |
| 08004837 | 1/1996 | Japan . |

*Primary Examiner*—Roger J. Schoeppel
*Attorney, Agent, or Firm*—Pearne, Gordon, McCoy and Granger LLP

[57] ABSTRACT

A pulley assembly for a driven shaft is disclosed. The pulley assembly includes a pulley to which a turning force is transferred from a driving unit; a sleeve fixedly mounted to a casing of the driven unit through which the driven shaft passes with a clearance between an outer periphery of the driven shaft and an inner periphery of the sleeve; a bearing structure for bearing the pulley rotatably about an axis of the driven shaft, the bearing structure being disposed between the pulley and the sleeve; and a torque transferring structure for transferring the turning force transferred to the pulley to the driven shaft, the torque transferring structure being interposed between the pulley and the driven shaft.

8 Claims, 3 Drawing Sheets

PULLEY ASSEMBLY FOR DRIVEN SHAFT

BACKGROUND OF THE INVENTION

This invention relates to a pulley assembly for a driven shaft of a driven unit, such as a lysholm compressor, and particularly, the present invention relates to technology for reducing noise caused by, for example, meshing gears of the driven unit.

Generally, in order to transfer the torque of a driving unit such as an internal-combustion engine to a driven shaft (input axis) of a driven unit such as a lysholm compressor, a damper pulley assembly is used.

In such a case, the damper pulley assembly is interposed between a belt for transferring the torque of the driving unit such as an internal-combustion engine and the driven shaft of the driven unit such as a lysholm compressor.

For example, Japanese Patent Application, First Publication No. 06-323402 shows a pulley assembly which comprises a boss integrated with a driven shaft (input axis) at a distal end of the driven shaft; a torque transferring hub connected to the boss; a pulley connected to the boss via a damping connector member and engaged with the torque transferring hub via teeth-like engaging members arranged between an inner surface of the pulley and an outer surface of the torque transferring hub; and a bearing means disposed between the inner surface of the pulley and the outer surface of the torque transferring hub. In such pulley assemblies, when the pulley is rotated by a belt driven by a driving unit such as an internal-combustion engine, the rotation is transferred to the driven shaft of the driven unit via the engaging members, the torque transferring hub, and the boss.

When the driving unit is a recipro type internal-combustion engine, the input torque to the pulley by the belt includes torque fluctuation, since such driving units include four different strokes: admission, compression, combustion, and exhaust. Even in such situations, the torque fluctuation may possibly be damped or absorbed by the damping connector member.

However, when some of the torque fluctuation is not absorbed, the remainder of the fluctuation is transferred to, for example, a gear train of the driven unit. This causes a periodic change of the engagement of the gears, and thereby generates a gear meshing or gear beating noise. Furthermore, the noise can be returned in a backward direction along the rotation transferring path, such as the driven shaft, and radiated into the surroundings through an exposed surface of the pulley assembly.

Although, such noise can be effectively reduced by improving the accuracy of the gear engagement, it requires precision processing as well as precision working for assembling such precision parts.

SUMMARY OF THE INVENTION

The present invention was developed in view of the above situation, and it is an object thereof to provide a pulley assembly which can achieve the following:

a) Restraint of the radiation of the noise generated adjacent to the boss. This is based on the fact, established through research conducted by the inventors, that in pulleys like those described above, the noise is radiated essentially from the internal exposed surface of the pulley assembly;

b) Improvement in the strength of the bearing means for the pulley;

c) Reduction in the noise radiation area, and prevention of dust from penetrating into the pulley assembly;

d) Reduction in the effect of the processing accuracy for distinct parts of the driven unit, such as gears.

In order to accomplish these objects, the present invention provides:

A pulley assembly for a driven shaft of a driven unit, the pulley assembly comprising: a pulley to which a turning force is transferred from a driving unit; a sleeve fixedly mounted to a casing of the driven unit through which the driven shaft passes with a clearance between an outer periphery of the driven shaft and an inner periphery of the sleeve; a bearing means for bearing the pulley rotatably about an axis of the driven shaft, the bearing means being disposed between the pulley and the sleeve; a torque transferring means for transferring the torque transferred to the pulley to the driven shaft, the torque transferring means being interposed between the pulley and the driven shaft.

Preferably, the pulley assembly of the present invention is arranged on the end of the driven shaft which protrudes from an end of a casing of the driven unit.

In accordance with a basic aspect of the present invention, in the puller assembly, when a turning force is transferred from a driving unit to the pulley, the pulley is rotated via the bearing means around an axis of the driven shaft of the driven unit, and the turning force is then transferred to the torque transferring means, and then to the driven shaft of the driven unit. Since the pulley is borne on the bearing means supported on the sleeve, the rigidity of the assembly can be improved.

In an improved aspect of the present invention, the pulley is formed with an annular concave portion opened to one side (preferably, an outer side) of the pulley; and the torque transferring means is formed in a cup-like shape having a circular bottom plate portion opposed to one side of the pulley and a cylindrical side wall portion unitized with the circular bottom plate portion. The cylindrical side wall portion of the torque transferring means penetrating into the annular concave portion to engage with the pulley. With this structure, radiation of the noise caused by the torque transferring means, in particular the radiation backward, is considerably reduced.

Preferably, the engagement between the pulley and the torque transfer means is achieved by teeth-like engaging members which are formed on the torque transferring means and on the pulley, respectively.

In an another improved aspect of the present invention, a damping connector member is interposed between the pulley and the driven shaft in order to damp fluctuation in the torque which will be transferred to the driven shaft. Preferably, the damping connector member is formed in a disk-like shape having a center bore, and the outer periphery of the damping connector member is connected to the pulley, and the inner periphery of the same is associated with the driven shaft, preferably via a boss fixed to the driven shaft. Also, the damping connector member is preferably located at an outer most position such that the damping member covers one side of the pulley assembly. By this structure, a space located to the outer side of the pulley is closed from its surroundings, and the noise radiated forward is substantially restricted.

In further improved aspect of the present invention, the sleeve has a cylindrical, but diametrically stepwise reduced shape having at least one diametrically reduced portion reduced via at least one shoulder portion. The shoulder portion is located in the other side (inner side) of the pulley and adjacently faces a rear face of the bearing means, so that an opening portion located in the rear of the bearing means is substantially closed, and thus, the noise radiated backward is substantially reduced. Preferably, a circular dust seal for preventing dust from being intruded into the bearing means is interposed between the shoulder portion of the sleeve and a rear face of the bearing means. With this structure, the circular dust seal can effectively prevent noise from radiating backward.

DETAILED DESCRIPTION OF THE PREFERRED EMBODIMENTS

Figure 3:
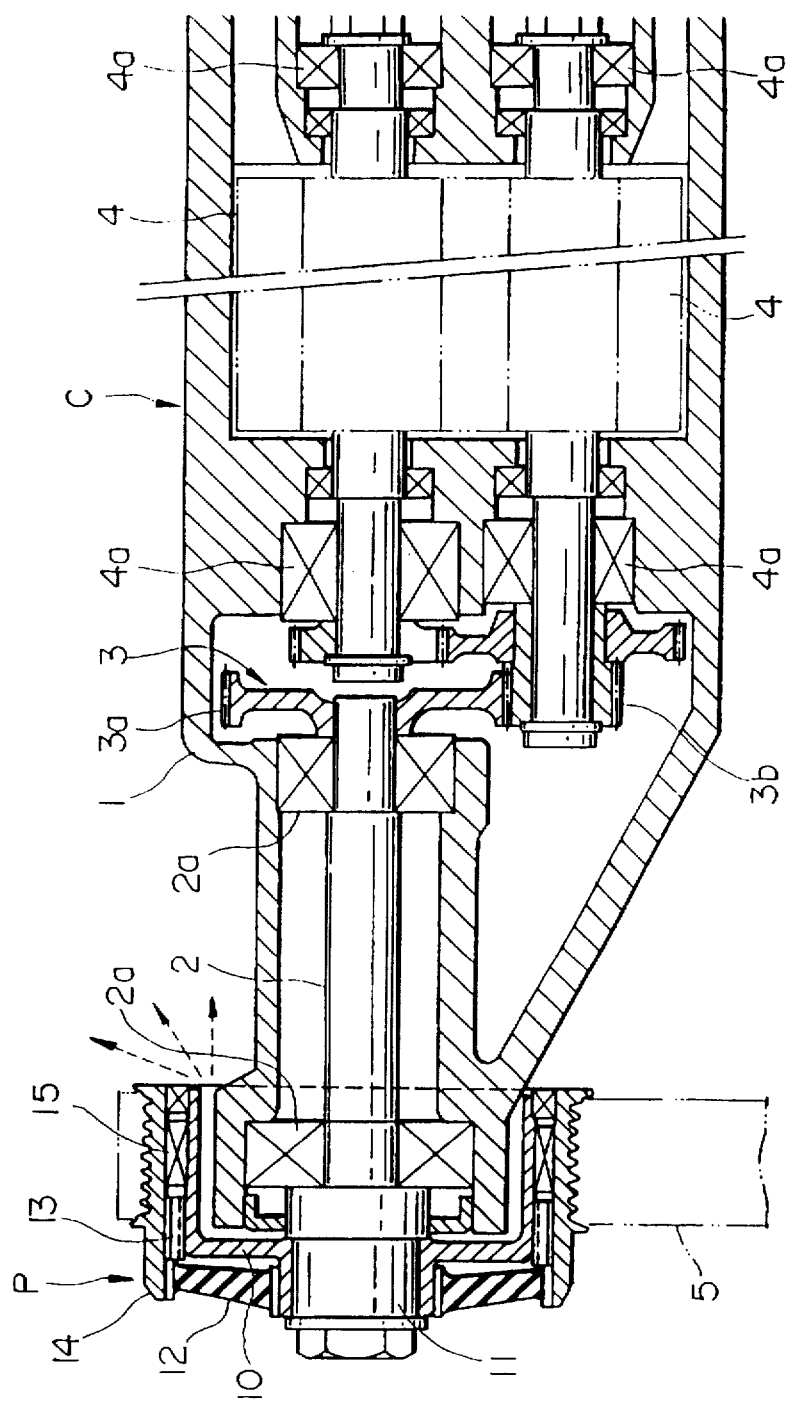
FIG. 3 is a sectional view of a conventional damper pulley assembly for a lysholm compressor.

FIG. 3 shows an example of a conventional pulley assembly P. In this example, the pulley assembly P is a damper pulley assembly for a lysholm compressor C.

For example, the lysholm compressor C comprises a casing 1; a driven shaft 2; bearings 2a for the driven shaft 2; a speed increasing gear train 3 including a drive gear 3a and a driven gear 3b; a pair of rotors 4 connected to the driven shaft 2 via the gear train 3; and bearings 4a for the rotors 4.

The pulley assembly P is interposed between a belt 5 for transferring a turning force of a driving unit such as an internal-combustion engine (not shown) and the driven shaft 2 of the lysholm compressor C. The pulley assembly P comprises a boss 11 integrated with the driven shaft 2 at a distal end of the driven shaft; a torque transferring hub 10 connected to the boss 11; a pulley 14 connected to the boss 11 via a damping connector member 12 and engaged with the torque transferring hub 10 via teeth-like engaging members 13 arranged between an inner surface of the pulley 14 and an outer surface of the torque transferring hub 10; and a bearing 15 disposed between the inner surface of the pulley 14 and the outer surface of the torque transferring hub 10.

Here, the torque transferring hub 10 rotates together with the pulley 14 by means of the teeth-like engaging members 13. However, there are certain gaps between the adjacent two teethlike engaging members 13 in order to create a certain rotational displacement between the pulley 14 and the torque transferring hub 10, and this rotational displacement is used for damping the torque fluctuation by the damping connector member 12. It is the bearing 15 that bears the rotational displacement between the pulley 14 and the torque transferring hub 10.

In pulley assembly P, when the pulley 14 is rotated by the belt 5 driven by a driving unit such as an internal-combustion engine, the rotation is transferred to the pair of rotors 4 of the lysholm compressor C via the engaging members 13, the torque transferring hub 10, the boss 11, the driven shaft 2, and the gear train 3.

When the driving unit is a recipro type internal-combustion engine, the input torque to the pulley 14 by the belt 5 includes torque fluctuation. Even in such a situation, the torque fluctuation may possibly be damped or absorbed by the damping connector member 12.

However, when some of the torque fluctuation is not absorbed, the remainder is transferred to the gear train 3 of the lysholm compressor C. This causes a periodic change of the engagement of the gears 3a and 3b, and thereby generates a gear meshing or beating noise. Furthermore, the noise can be returned in a backward direction along a rotation transferring path such as the driven shaft 2, and radiated into the surroundings through an exposed surface of the pulley assembly P, in particular, an exposed surface of the torque transferring hub 10.

Figure 1:
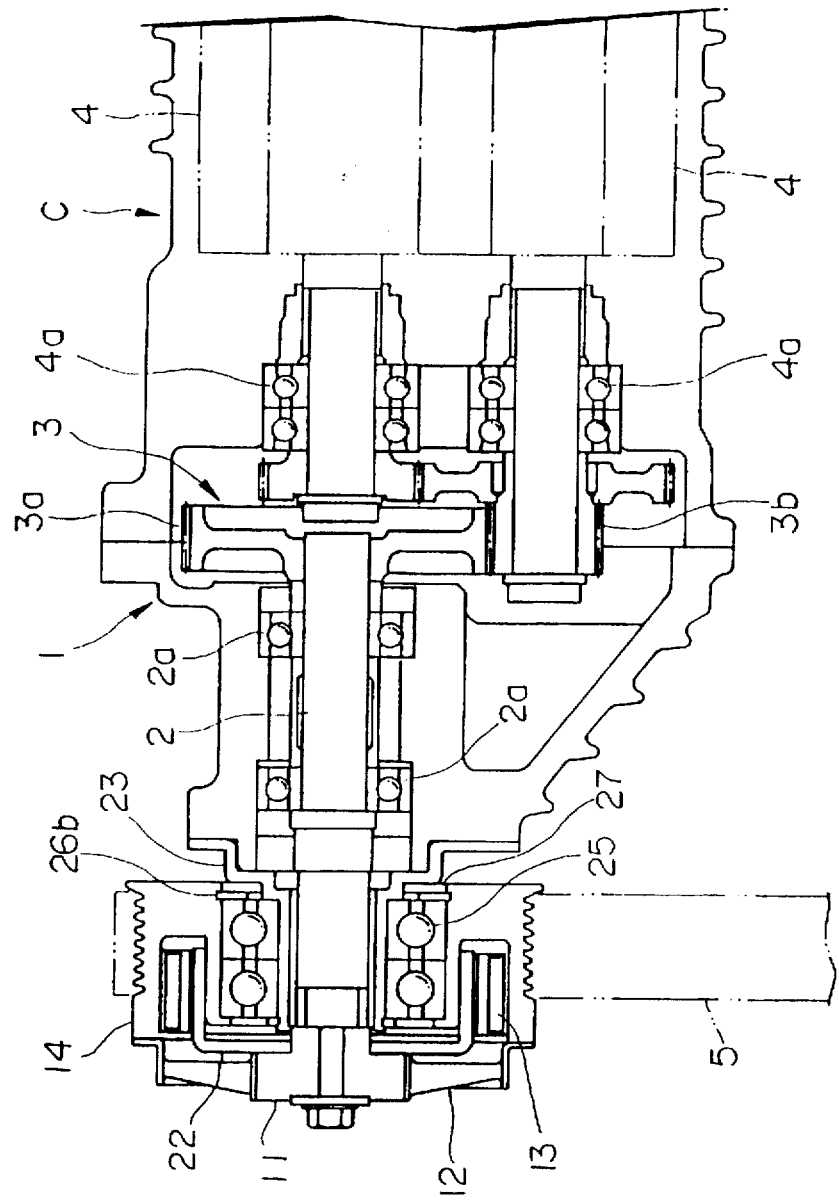
FIG. 1 is a schematic sectional view of the pulley assembly in accordance with an embodiment of the present invention, shown with a lysholm compressor, as an example, on which the pulley assembly is mounted.
Figure 2:
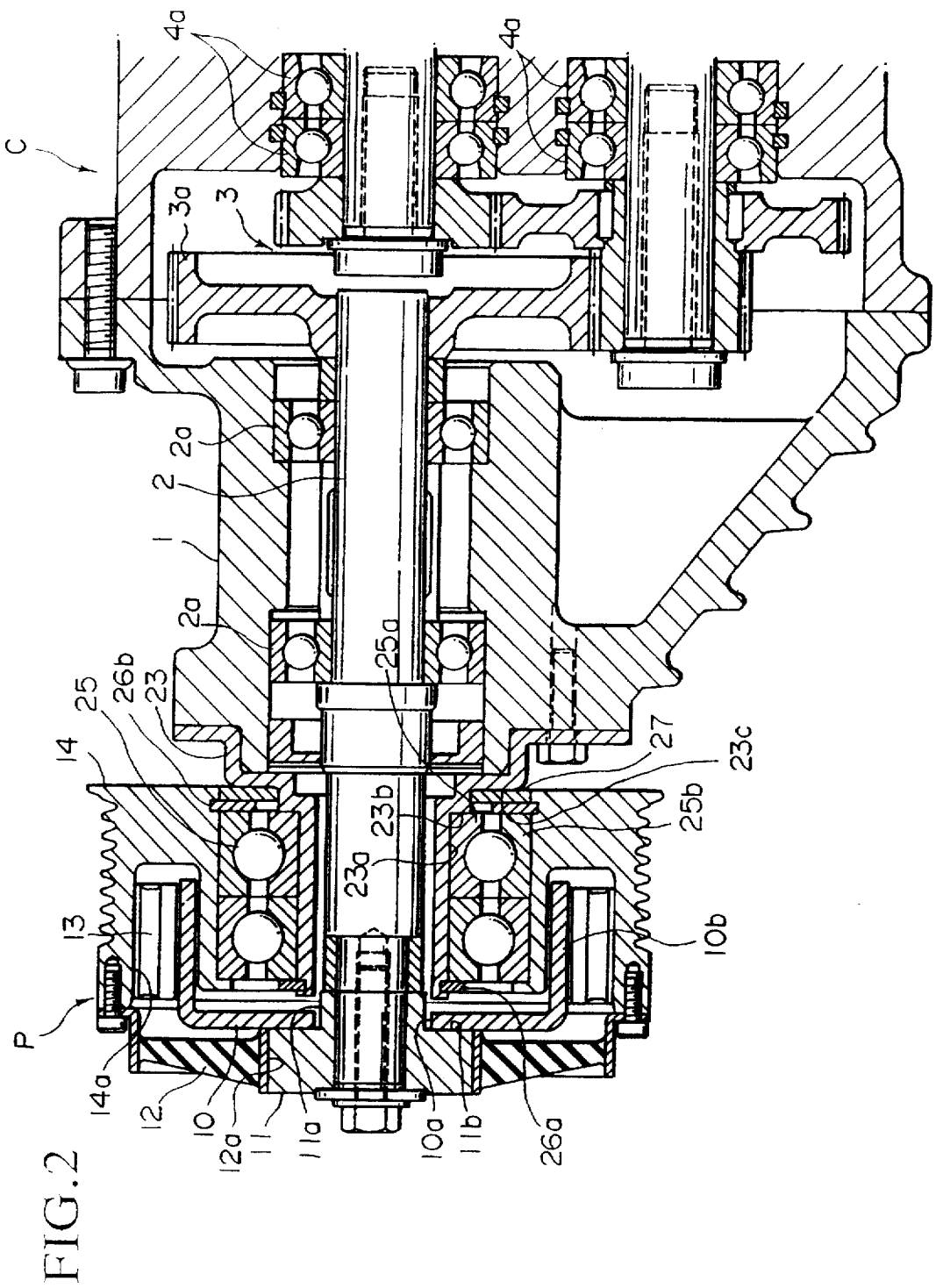
FIG. 2 is an enlarged sectional view of the pulley assembly shown in FIG. 1.

Now, the pulley assembly for driven axis in accordance with an embodiment of the present invention will be specifically explained hereinbelow with reference to FIGS. 1 and 2. In this embodiment, the pulley assembly is a damper pulley assembly adapted for a lysholm compressor C, for example. In FIGS. 1 and 2, like components which are shown in FIG. 3 are indicated by the same numerals.

With reference to FIGS. 1 and 2, the pulley assembly P in accordance with an embodiment of the present invention essentially includes a boss 11 fixed to an input axis or driven shaft 2 of the lysholm compressor C at a distal end of the driven shaft; a torque transferring hub (turning force transferring means) 10 connected to the boss 11; a pulley 14 connected to the boss 11 via a damping connector member 12 and engaged with the torque transferring hub 10 via teeth-like engaging members 13 arranged between an inner surface of the pulley 14 and an outer surface of the torque transferring hub 10; a sleeve 23 into which the driven shaft 2 penetrates; and bearings 25 disposed between the inner surface of the pulley 14 and the outer surface of the sleeve 23.

The end portion of the driven shaft (input axis) 2 of the lysholm compressor C protrudes a certain length from an end of the casing 1 of the lysholm compressor C.

The boss 11 is mounted at, and integrated with the distal end of the driven shaft 2.

The damping connector member 12 is formed in a disk-like shape having a center bore 12a. The outer periphery of the damping connector member 12 is connected to the pulley 14, and inner periphery 12a of the same is connected to and integrated with the boss 11 which is fixed to the driven shaft 2. The damping connector member 12 is located at an outer most position of the pulley assembly P such that the damping member 12 covers the outer side of the pulley assembly P. The boss 11 has a diametrically reduced portion 11a forming a shoulder portion 11b.

The sleeve 23 has a cylindrical, but diametrically stepwise reduced shape having a diametrically reduced portion 23a. The sleeve 23 is mounted, at the end having a larger diameter, on the end of the casing 1 of the lysholm compressor C. The protruding end of the driven shaft 2 of the lysholm compressor C passes through the diametrically reduced portion 23a of the sleeve 23, with a certain annular gap between the outer surface of the driven shaft 2 and the inner surface of the reduced portion 23a of the sleeve 23.

A bearing means, that is a pair of ball bearings 25 in this case, are mounted on the outer periphery of the reduced portion 23a of the sleeve 23, and the pulley 14 is mounted on the outer periphery of the bearings 25. Thus, the pulley 14 is rotatable with respect to the sleeve 23. The bearing means 25 is positioned in the distal direction by a first retaining ring 26a, and is positioned in the proximal direction by a first shoulder portion 23b of the sleeve 23.

The pulley 14 is formed with an annular concave portion 14a on one side (outer side) facing the damping connector member 12. The pulley 14 is positioned in the distal direction by the second retaining ring 26b which is elastically mounted in an inner annular groove formed on an inner periphery of the pulley, and is positioned in the proximal direction by an inward protruding portion of the pulley 14 which engages with the outer ring 25b of the bearing 25. The second retaining ring 26b has an elastic force biased outward, and is generally referred to as "E-ring".

A belt 5 (see FIG. 1) driven by a driving unit such as a recipro type internal-combustion engine (not shown) runs around a part of the periphery of the pulley 14.

The torque transferring hub 10 has a cup-like shape, having an opening 10a at the center thereof into which the diametrical reduced portion 11a of the boss 11 penetrates. The torque transferring hub 10 is integral with the boss 11 by its connection to the shoulder portion 11b of the boss adjacent to the opening 10a. A cylindrical side wall portion 10b of the torque transferring hub 10 penetrates into the annular concave portion 14a of the pulley 14.

At the outer periphery of the cylindrical side wall portion 10b of the torque transferring hub 10 and at the inner wall of the annular concave portion 14a opposing the outer periphery of the cylindrical side wall portion 10b, a plurality of teeth 13 are formed respectively, and these teeth 13 are engaged with one another with a gap between the adjacent two teeth. Thus, when the pulley 14 is rotated, the torque transferring hub 10 is also rotated together with the pulley 14.

Finally, a dust seal 27 is provided between a second shoulder portion 23c of the sleeve 23 and a proximal end face of the bearing means 25 via the second retaining ring 26b, so as to cover a gap formed between an inner ring 25a and an outer ring 25b of the bearing 25.

The effects and advantages of the above pulley assembly P will be explained hereinbelow.

When the belt 5 is driven by the driving unit, the pulley 14 is rotated around the axis of the driven shaft 2 via the bearing means 25. The turning force of the pulley 14 is transferred to the torque transferring hub 10 via the teeth-like engaging members 13, then to the boss 11, and to the input axis or the driven shaft 2 of the lysholm compressor C. The torque transferred to the driven shaft 2 is then transferred to the pair of rotors 4 of the lysholm compressor C via the gear train 3.

In this case, since the driving unit is a recipro type internal-combustion engine, the input torque to the pulley 14 by the belt 5 includes torque fluctuation. Even in such a situation, the fluctuation may possibly be damped or absorbed by the damping connector member 12 connected between the pulley 14 and the boss 11. When some of the fluctuation is not absorbed, the remainder of the fluctuation is transferred to the gear train 3 of the lysholm compressor C, and this causes a periodic change of the engagement condition between the gears 3a and 3b, and thereby generates a gear meshing or beating noise. Since the noise can be returned to the pulley assembly P via the driven shaft 2, when there is an exposed surface communicating with the surroundings on the pulley assembly P, the noise can be radiated out through the exposed surfaces, in particular, through the torque transferring hub 10.

However, in the pulley assembly P according to the present invention, such exposed surfaces are scarce since both the space to the outer side of the torque transferring hub 10 and the space to the inner side of the torque transferring hub 10 are closed by the damping connector member 12 and pulley 14 respectively, and thus the noise returned back to the pulley assembly P from the gear train 3 can be reduced.

Although the torque transferring hub 10 is engaged with the pulley 14 via the teeth-like engaging members 13, the noise radiated out through the torque transferring hub 10 is reduced since the engaging members 13 are located within the annular concave portion 14a of the pulley 14 which is almost closed.

Only between the rear end of the pulley 14 and the second shoulder portion 23c of the sleeve 23, a small gap or opening may be formed. However, the radiation of the noise from the gap or opening is very low compared to the noise caused by the torque transferring hub 10. Furthermore, in the above embodiments, the gap or opening is closed with the dust seal 27, thus the noise radiated from the gap can also be considerably reduced. However, it will be appreciated by one skilled in the art that it is possible to omit the dust seal 27 if the gap between the second shoulder portion 23c and the pulley 14 is made sufficiently small.

The meshing or beating noise returned to the pulley assembly P may also be radiated from the surface of the boss 11. However, the damping connector member 12 made of elastic material is mounted on the periphery of the boss 11, and thus the radiation of the noise out of the boss 11 is reduced.

Furthermore, with the pulley assembly P of the present invention, since the meshing or beating noise can be considerably reduced in this way, it is not necessary to expressly improve the accuracy of the gear engagement to reduce the meshing or beating noise of the gear train 3, nor is it necessary for precision processing or precision working for assembling such precision parts.

Additionally, in the pulley assembly P in accordance with the present invention, since the pulley 14 is rotatably supported on the sleeve 23 (which is rigidly fixed to the casing 1) via the bearing means 25, the entire rigidity of the pulley assembly P and the strength of the bearing means 25 can be improved, and this also leads to success in reducing the noise radiated from the assembly.

by research conducted by the inventors, it was found that when the pulley assembly is structured as shown in FIGS. 1 and 2, the noise radiated from the assembly was reduced over the entire rotational frequency area compared to the conventional pulley assembly of the type as shown in FIG. 3, and, in particular, the noise was reduced to about 15–20 dB at maximum.

Lastly, although the pulley assembly of the present invention has been explained using the preferred embodiments, which are adapted to a lysholm compressor as described above, one skilled in the art will understand that the pulley assembly P of the present invention is also applicable and effective for any driven shaft of, for example, other types of compressors, pumps, or other driven units. Furthermore, although the above explanation was made using a drive unit for driving the pulley assembly P of a recipro internal-combustion engine, it is not limited to this type of drive unit.

What is claimed is:

1. A pulley assembly for a driven shaft of a driven unit, said pulley assembly comprising:

a pulley to which a turning force is transferred from a driving unit, said pulley being formed with an annular concave portion opened to one side of said pulley;

a sleeve fixedly mounted to a casing of said driven unit, through which said driven shaft passes with a clearance between an outer periphery of said driven shaft and an inner periphery of said sleeve;

a bearing means for bearing said pulley rotatably about an axis of said driven shaft, said bearing means being disposed between said pulley and said sleeve; and a torque transferring means for transferring said turning force transferred to said pulley to said driven shaft, said torque transferring means being interposed between said pulley and said driven shaft and being engaged with said pulley by means of a plurality of teeth-like engaging members formed on said torque transferring means and on said pulley respectively, said teeth-like engaging members being arranged in said annular concave portion of said pulley.

2. The pulley assembly for a driven shaft according to claim 1, wherein said torque transferring means is formed in a cup-like shape having a circular bottom plate portion opposing said one side of said pulley, and a cylindrical side wall portion unitized with said circular bottom plate portion, and said cylindrical side wall portion of said torque transferring means penetrates into said annular concave portion formed on said pulley, whereby a space located in front of said bearing means are closed from the surroundings.

3. A pulley assembly for a driven shaft of a driven unit, said pulley assembly comprising:

a pulley to which a turning force is transferred from a driving unit;

a sleeve fixedly mounted to a casing of said driven unit, through which said driven shaft passes with a clearance between an outer periphery of said driven shaft and an inner periphery of said sleeve;

a bearing means for bearing said pulley rotatably about an axis of said driven shaft, said bearing means being disposed between said pulley and said sleeve;

a torque transferring means for transferring said turning force transferred to said pulley to said driven shaft, said torque transferring means being interposed between said pulley and said driven shaft; and a damping connector member interposed between said pulley and said driven shaft in order to damp fluctuation in said torque which will be transferred to said driven shaft.

4. The pulley assembly for a driven shaft according to claim 3, wherein said damping connector member is formed in a disk-like shape, with its outer periphery being connected to said pulley and its center portion being associated with said driven shaft, whereby a space located in front of said pulley is closed from the surroundings.

5. The pulley assembly for a driven shaft according to claim 3, wherein both said torque transferring means and said damping connector member are connected to said driven shaft via a boss fixed to a distal end of said driven shaft.

6. A pulley assembly for a driven shaft of a driven unit, said pulley assembly comprising:

a pulley to which a turning force is transferred from a driving unit;

a sleeve fixedly mounted to a casing of said driven unit, through which said driven shaft passes with a clearance between an outer periphery of said driven shaft and an inner periphery of said sleeve, said sleeve having a cylindrical, but diametrically stepwise reduced shape including at least one diametrically reduced portion reduced via at least one shoulder portion;

a bearing means for bearing said pulley rotatably about an axis of said driven shaft, said bearing means being disposed between said pulley and said sleeve, and said shoulder portion of said sleeve adjacently facing a rear face of said bearing means, so that a space located in the rear of said bearing means is substantially closed; and a torque transferring means for transferring said turning force transferred to said pulley to said driven shaft, said torque transferring means being interposed between said pulley and said driven shaft.

7. The pulley assembly for a driven shaft according to claim 6, wherein a circular dust seal is interposed between said shoulder portion of said sleeve and a rear face of said bearing means.

8. A pully assembly for a driven shaft of a lysholm compressor, said pulley assembly comprising:

a pulley to which a turning force is transferred from a driving unit;

a sleeve fixedly mounted to a casing of said driven unit, through which said driven shaft passes with a clearance between an outer periphery of said driven shaft and an inner periphery of said sleeve;

a bearing means for bearing said pulley rotatable about an axis of said driven shaft, said bearing means being disposed between said pulley and said sleeve; and a torque transferring means for transferring said turning force transferred to said pulley to said driven shaft, said torque transferring means being interposed between said pulley and said driven shaft.

* * * * *